United States Patent [19]

Fujiwara

[11] Patent Number: 4,933,722
[45] Date of Patent: Jun. 12, 1990

[54] OPTICAL TEXT READING APPARATUS

[75] Inventor: Katsuyoshi Fujiwara, Osaka, Japan

[73] Assignee: Sharp Kabushiki Kaisha, Osaka, Japan

[21] Appl. No.: 371,827

[22] Filed: Jun. 27, 1989

[30] Foreign Application Priority Data

Jun. 28, 1988 [JP] Japan ............................. 63-162258

[51] Int. Cl.⁵ ...................... G03G 15/28; G03G 21/00
[52] U.S. Cl. .................................. 355/233; 355/235; 355/315
[58] Field of Search .................... 355/235, 233, 315

[56] References Cited

U.S. PATENT DOCUMENTS 4,218,128  8/1980  Satomi et al.
4,494,861  1/1985  Tachika et al. ............... 355/315 X
4,536,077  8/1985  Stoffel.

Primary Examiner—A. T. Grimley
Assistant Examiner—S. Hoffman
Attorney, Agent, or Firm—Birch, Stewart, Kolasch & Birch

[57] ABSTRACT

An optical document reading apparatus for scanning a document operates by driving an optical system and for reading the document being transported while the optical system is held still at a predetermined reading position. In the device herein a scan start position from which the optical system is moved is defined at the initial reading position.

5 Claims, 7 Drawing Sheets

OPTICAL TEXT READING APPARATUS

BACKGROUND OF THE INVENTION

1. Field of the Invention

The present invention relates to an optical document reading apparatus, such as, for example, an electrophotographic copying machine equipped with a recirculation document handler (RDH) or recirculating automatic document feeder, of a type having dual functions of scanning a document to be copied with the optical system moved relative to the document and of scanning the document with the document moved relative to the optical system.

2. Description of the Prior Art

In order to avoid an inconvenience in a system, where a plurality of documents are desired to be copied, the operator has to place the documents one by one on a document support, the electrophotographic copying machine is often equipped with a so-called recirculating automatic document feeder unit. The recirculating automatic document feeder unit is operable in synchronism with the copying operation taking place in the electrophotographic copying machine to successively feed the documents and permits the electrophotographic copying machine to realize a function of copying images born on, for example, both sides of each, onto opposite sides of a copying paper. An example of such electrophotographic copying system is disclosed in, for example, the U.S. Pat. No. 4,218,128, issued Aug. 19, 1980, and U.S. Pat. No. 4,536,077, issued Aug. 20, 1985.

The electrophotographic copying machine equipped with the recirculating automatic document feeder unit is known to have two operational modes. When a copying operation is to take place with the document placed on the document support, the system assumes the first operational mode in which an illuminating device including an illuminator; such as a halogen lamp and reflecting mirrors, all disposed beneath the document support (within the electrophotographic copying machine), is driven at equal speed to scan the document. On the other hand, when the documents are successively transported by utilization of the recirculating automatic document feeder unit, while each document is turned around a transport device of right cylindrical shape, the system assumes, the second operational mode in which the illuminating device is held still at a predetermined exposure position adjacent the transport device to scan the document being transported. The predetermined exposure position is generally defined in the vicinity of one of opposite ends of the stroke of movement of the illuminating device.

Rays of light from the illuminating device are guided towards the document and are selectively absorbed in correspondence with an image born on the document. Rays of light reflected from the document are then guided towards a photosensitive surface of a photoreceptor drum through a plurality of reflecting mirrors and a zooming lens assembly. As is well known to those skilled in the art, the photoreceptor drum is supported for rotation in one direction past a plurality of processing stations including a charging station at which point a corona discharger for electrostatically charging the photosensitive surface of the photoreceptor drum is disposed; a developing station at which a developing unit is disposed for applying a toner material to develop an electrostatic latent image into a visible powder image; a transfer station at which a transfer corona discharger is disposed for facilitating the transfer of the visible powder image onto a copying paper; and a cleaning station at which residue toner material and residue electrostatic charge are removed from the photosensitive surface of the photoreceptor drum in readiness for the next cycle of the copying operation.

In the first operational mode, during which the copying operation is carried out while the document has been placed on the document support, control is made to permit the operation of the optical system, including the illuminating device, the reflecting mirrors and the zooming lens assembly, to have a synchronized relationship with the operation of the processing units disposed radially outwardly of, and in the vicinity of, the photoreceptor drum. On the other hand, in the second operational mode, during which the recirculating automatic document feeder unit is utilized, control is made to permit the operation of the processing units around the photoreceptor drum to have a synchronized relationship with the transport of the document effected by the recirculating automatic document feeder unit. In either case, a copy of acceptable quality can be obtained on the copying paper.

In the prior art electrophotographic copying apparatus of the type referred to above, a detector for detecting the illuminating device, is employed and disposed at each of the positions, which the illuminator device assumes during the second operational mode and the scan start position which the illuminator device assumes during the first operational mode. Where the switching is effected between the first and second operational modes, the illuminating device is moved to one of the positions detected by the respective detectors prior to the start of the copying operation. Accordingly, the change in operational mode in the prior art electrophotographic copying machine requires a certain length of time during which the illuminating device is moved from one position to another. Where such movement of the illuminating device takes place frequently, it has been found that a drive unit, including a drive motor for driving the optical system, tends to be run out quickly, shortening the service life of the electrophotographic copying apparatus. Also, the use of the plural detectors associated with the operational modes constitutes an increased manufacturing cost.

SUMMARY OF THE INVENTION

Accordingly, the present, invention has been devised with a view to substantially eliminate the above discussed problems and is intended to provide an optical document reading apparatus wherein the switching between the first and second operational modes can be quickly achieved and which has an improved service life.

To this end, the present invention provides an optical document reading apparatus for scanning a document by driving the optical system and for reading the document being transported while the optical system is held still at a predetermined reading position, which is characterized in that a scan start position from which the optical system is driven to scan the document is defined at the reading position.

According to the present invention, during the first operational mode in which the optical system is moved to scan the document, the optical system starts its movement from the scan start position which is selected to match with the reading position at which the optical system is held still for reading the document during the second operational mode.

Accordingly, even when the mode is changed from either the first or second operational modes, to the other thereof, the optical scanning system need not be moved and, therefore, the change in operational mode can be carried out quickly. Also, since the optical scanning system need not be moved during the change in operational mode, the service life of a structure necessary to move the optical system can be prolonged, thereby improving the service life of the optical reading apparatus. Moreover, since the reading position and the scan start position are defined at the same location, the number of the detectors necessary to detect the positions of the optical system can be reduced, contributing to the reduction in manufacturing cost.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE INVENTION

Figure 1:
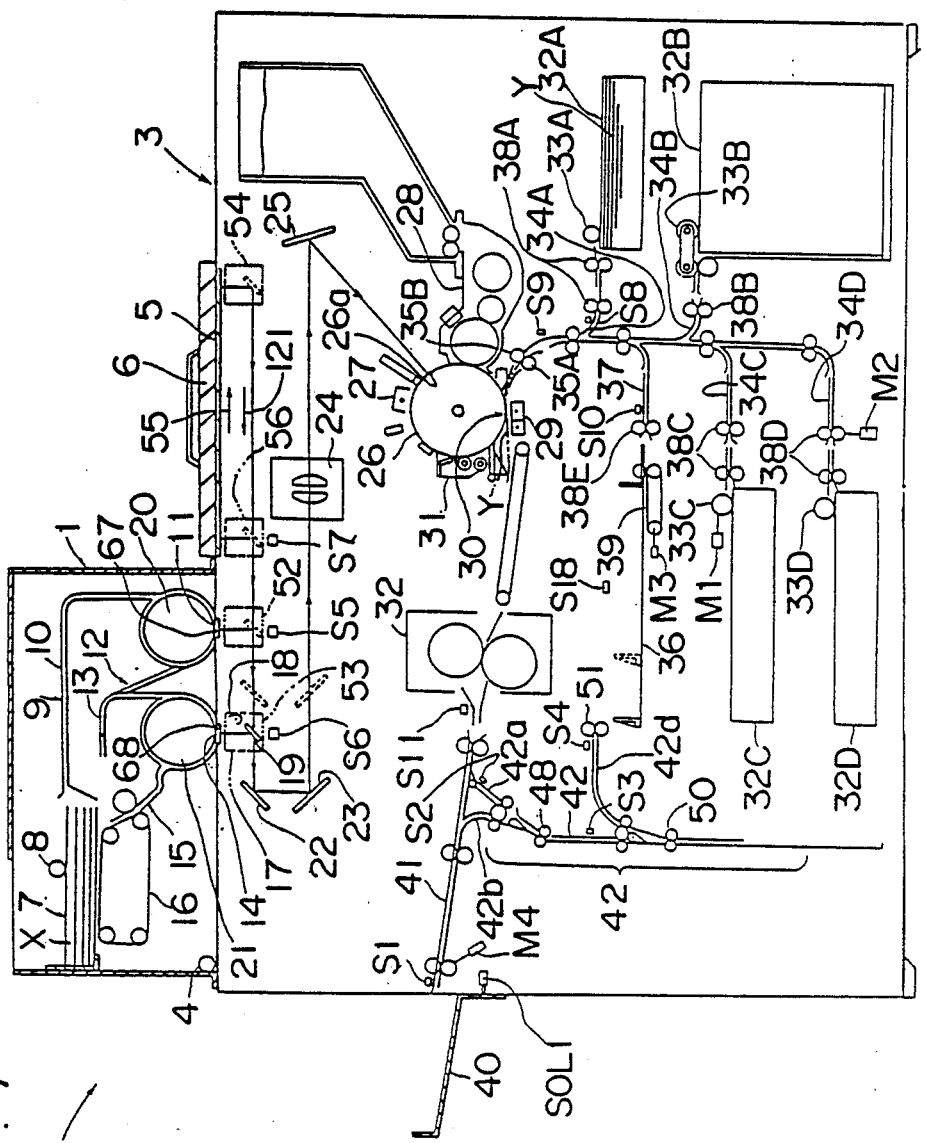
FIG. 1 is a schematic side sectional view of a copying apparatus embodying the present invention.

Before the description of the present invention begins, it is to be noted that like parts are designated by like reference numerals throughout the accompanying drawings.

FIG. 1 illustrates, in schematic side sectional representation, an electrophotographic copying machine 2 equipped with a recirculating automatic document feeder unit (RDH) 1. The document feeder unit 1 is mounted on a top left portion of a housing 3 for the copying machine 2 by means of a pivot shaft 4 for pivotal movement between an operative position, as shown, and an inoperative position about the pivot shaft 4. On a generally top right portion of the machine housing 3 adjoining the document feeder unit 1, a document support 5 made of a hard glass plate is disposed for the support thereon of a document to be copied, together with a presser plate 6 mounted for pivotal movement between opened and closed positions relative to the transparent document support 5. The presser plate 6 is adapted to be moved to the closed position, when and after the document has been placed on the document support 5, to retain the document in position against the document support 5.

The copying operation of the copying machine 2 is carried out either with the use of the document feeder unit 1 or with the document, being placed on and pressed against the document support 5 by means of the presser plate 6.

In the document feeder unit 1, a stack of sheet-like documents X piled up in an order of sequential pages is placed within a document hopper 7. The sheet-like documents X are successively drawn one after another from the uppermost sheet-like document by utilization of a document feed roller 8 onto a first delivery device 9. The first delivery device 9 includes a delivery passage 10 extending generally horizontally in one direction and then in the opposite direction after having been bent downwards. Each of the original documents X can be turned upside down when conveyed through the delivery passage 10.

The automatic document feeder unit 1 includes a first document feed drum 20 of right cylinder having its axis of rotation lying in a direction substantially perpendicular to the longitudinal sense of the document support 5, the first document feed drum 20 being operable in association with the document delivery passage 10. This first document feed drum 20 is positioned so as to align with a first illuminating station 11 where a generally rectangular transparent glass plate 67 is disposed and, therefore, the sheet-like document X, being conveyed through the document delivery passage 10, can be turned around the document feed drum 20. Here consecutive portions of a radially outwardly oriented first side of the sheet-like document X are consequently exposed to the first illuminating station 11 so that the consecutive portions of the sheet-like document X can be illuminated.

The sheet-like document X having been transported by the first document feed drum 20 is subsequently guided to a second document delivery device 12 which includes a document inverting passage 13 for turning the document X upside down. The document X, guided to the inverting passage 13, is subsequently turned around a second document feed drum 21 of right cylinder and is transported by the second document feed drum 21. Here, consecutive portions of a radially outwardly oriented second side of the document X are consequently exposed to a second illuminating station 14 which is positioned immediately below the second document feed drum 21. Thus, it will readily be understood that when the document X is passed through the first illuminating station 11 and then through the second illuminating station 14, while transported by the first and second document feed drums 20 and 21, respectively, the first and second sides of the document X which are opposite to each other can be exposed to the first and second illuminating stations 11 and 14, respectively.

The sheet-like document X, with its second side having been exposed to the second illuminating station 14, is subsequently guided by a third delivery device 15 onto a document hopper 7 and is inserted onto a document delivery belt 16 and the lowermost one of the sheet-like documents X is accommodated within the document hopper 7.

Within the interior of the machine housing 3, an illuminating device 17, including a light source 18, comprised of, for example, a halogen lamp, and a reflecting mirror 19, is supported for reciprocating movement in directions indicated by the arrows 55 and 121, respectively, and in a direction parallel to the document support 5 and perpendicular to the axis of rotation of any one of the first and second document feed drums 20 and 21. Rays of light emitted from the light source 18 are selectively absorbed in correspondence with an image, on any one of the first and second sides of the sheet-like document X. Rays of light reflected from the document X are passed towards an exposure station 26a through the reflecting mirror 19, a second reflecting mirror 22, a third reflecting mirror 23, a zooming lens assembly 24, and finally through a fourth reflecting mirror 25, thereby forming an image of the document X on a photosensitive surface of a photoreceptor drum 26 of right cylinder.

The photoreceptor drum 26 is supported for rotation in one direction about an axis of rotation thereof that extends parallel to the axis of rotation of any one of the document feed drums 20 and 21 and perpendicular to the direction in which the reflected rays of light from the fourth reflecting mirror 25 impinge upon the photosensitive surface thereof. During one complete rotation of the photoreceptor drum 26, the photoreceptor drum 26 can be moved past a plurality of processing stations including: a charging station at which a corona discharger 27 for electrostatically charging the photosensitive surface of the photoreceptor drum 26 is disposed; the exposure station 26a at which the imagewise light is projected to selectively deplete a portion of the electrostatic charge on the photosensitive surface of the photoreceptor drum 26 to form an electrostatic latent image on the photoreceptor drum 26 in a complemental relation with the image on the document X; a developing station at which a developing unit 28 is disposed for applying a toner material to develop the electrostatic latent image into a visible powder image; a transfer station 30 at which a transfer corona discharger 29 is disposed for facilitating the transfer of the visible powder image onto a copying paper Y; and a cleaning station at which a cleaning unit 31 is disposed to remove residue toner material remaining on the photoreceptor drum 26 in readiness for the next cycle of copying operation. The copying paper Y having received the visible powder image, is subsequently transported through a fixing unit 32 at which the powder image is heat-fused to permanently fix the powder image on the copying paper Y.

Within the machine housing 3 and generally beneath the photoreceptor drum 28, paper supply cassettes 32A, 32B, 32C and 32D are installed for accommodating respective stacks of copying papers of different sizes and are adapted to be selectively brought into operation. The papers in the stack accommodated within the paper supply cassette 32A can be successively drawn from the uppermost one of the papers by a supply roller 33A onto a supply passage 34A. Similarly, the papers in the stack accommodated within the paper supply cassette 32B, can be successively drawn from the uppermost one of the papers by a paper supply roller 33B onto a supply passage 34B; the papers in the stack accommodated within the paper supply cassette 32C can be successively drawn from the uppermost one of the papers by a paper supply roller 33C onto a supply passage 34C; and the papers in the stack accommodated within the paper supply cassette 32D can be successively drawn from the uppermost one of the papers by a paper supply roller 33D onto a supply passage 34D. The paper supply rollers 33A to 33D are adapted to be selectively driven by a drive means comprised of, for example, a drive motor M1. The supply passages 34A to 34D and a supply passage 37 leading from an intermediate tray 36, as will be described later, are provided with respective paired delivery rollers 38A to 38E which are adapted to be driven by a motor M2. By the action of those delivery rollers 38A to 38E, the paper within any one of the paper cassettes 32A to .32D and the intermediate tray 36 can be supplied towards the transfer station 30.

In the vicinity of the exit of the common delivery passage adjacent the paper supply passages 34A to 34D and the transfer station 30, a pair of resist rollers 35A and 35B are disposed. These resist rollers 35A and 35B are adapted to be selectively driven by a motor M2 through a clutch CLT1 so that the copying paper delivered through the common delivery passage adjacent the transfer station 30 can be fed to the transfer station 30 in synchronism with the arrival of the visible powder image carried by the photoreceptor drum 26 at the transfer station 30.

The machine housing 3 has a paper receiving tray 40 secured thereto in alignment with an ejecting passage 41 leading from the fixing unit 32 for receiving copying papers which have been successively passed through the fixing unit 32 and then transported through the ejecting passage 41. The paper receiving tray 40 is provided with an electromagnetic solenoid unit SOL1 adapted to be electrically energized for a predetermined length of time so that the paper receiving tray 40 can be upwardly shifted. By way of example, when the paper receiving tray 40 is shifted in one of opposite directions parallel to the plane of the drawing of FIG. 1 as a result of the energization of the solenoid unit SOL1, the paper receiving tray 40 will, when the solenoid unit SOL1 is energized during the next cycle, be shifted in the other of the opposite directions parallel to the plane of the drawing of FIG. 1. In this way, for a particular document, a plurality of copying papers Y on which an image of such particular document has been copied can be stacked on the paper receiving tray 40 in the form as sorted.

The ejecting passage 41 for ejecting the copying paper which has been passed through the fixing unit 32 onto the paper receiving tray 40 has an inverting passage 42 branched off from a generally intermediate portion of the ejecting passage 41 for guiding the copying paper, which has been passed through the fixing unit 32, towards the intermediate tray 36 in one of the following three processes depending on the operational mode of the copying machine 2 selected by the operator.

(1) The copying paper is passed through the ejecting passage 42 onto the paper receiving tray 40.

(2) The copying paper having a copied image formed on one of the opposite sides thereof is guided from the ejecting passage 41 into the inverting passage 42 and then into the intermediate tray 36 in readiness for the copying of the image on the other of the opposite sides of the same copying paper. The plural copying papers Y stacked in the intermediate tray 36 are successively drawn from the lowermost one of them by a supply roller 39 and then towards the transfer station 30 by means of the paper supply passage 37. After the powder image has been transferred onto the second side of each copying paper Y it is subsequently transported through the fixing unit 32 for filing the powder image. It is then ejected onto the paper receiving tray 40 through the ejecting passage 41.

(3) The copying paper having been guided into the inverting passage 42 from the ejecting passage 41 is, after having been turned upside down, again guided into the ejecting passage 41 and then onto the paper receiving tray 40.

Figure 2:
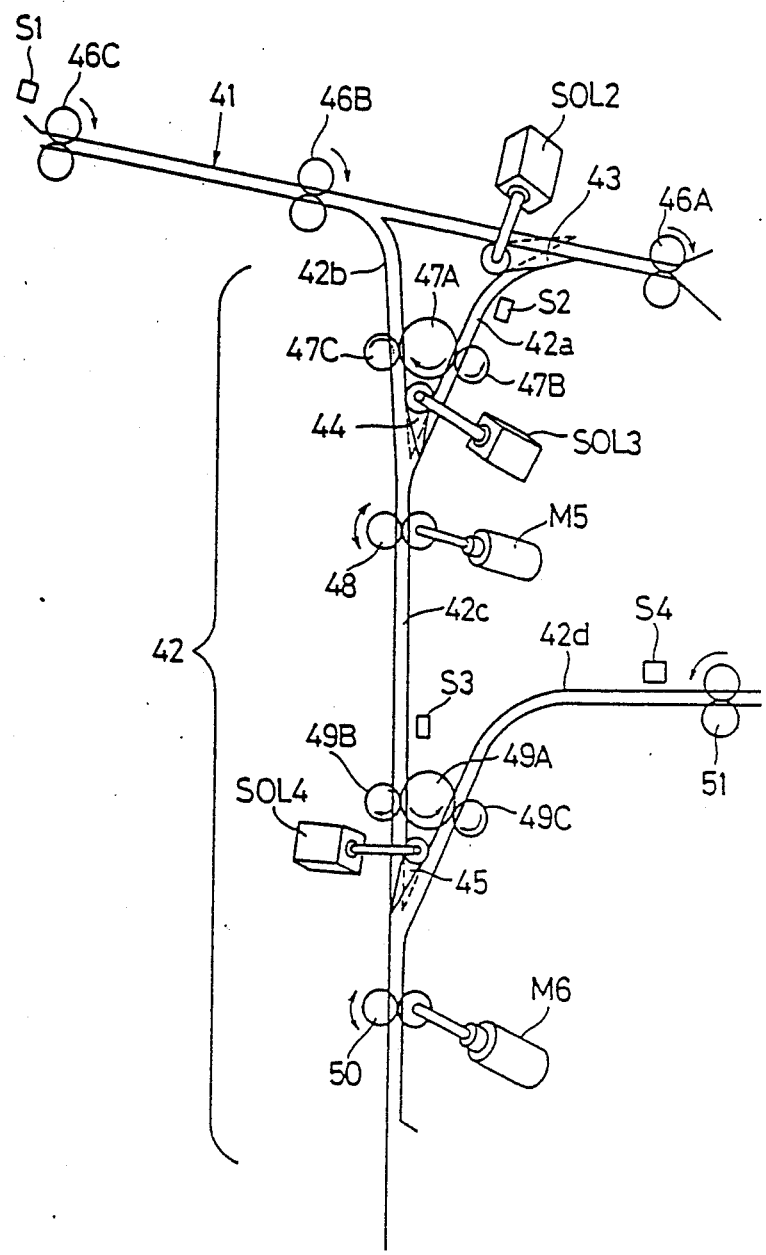
FIG. 2 is a schematic side sectional view showing an inverting passage used in the copying apparatus of FIG. 1.

In accomplishing any one of the foregoing processes (1) to (3), the ejecting passage 41 and the inverting passage 42 are so structured as shown in FIG. 2. As shown in FIG. 2, the inverting passage 42 comprises a first passage portion 42a branched off from an upstream portion of the ejecting passage 41 with respect to the direction of transport of the copying paper Y towards the paper receiving tray 40, a second passage portion 42b adjoining a downstream portion of the ejecting passage 41, a third passage portion 42c having an upper end joined with the first and second passage portions 42a and 42b, and a fourth passage portion 42d branched off from the third passage portion 43c and leading towards the intermediate tray 36.

At the point where the first passage portion 42a is branched off from the ejecting passage 41, a gate flapper 43 is disposed for selectively guiding the copying paper Y, which has been passed through the fixing unit 32, towards the paper receiving tray 40 or towards the first passage portion 42a, the gate flapper 48 being supported for pivotal movement between clear and deflecting positions and adapted to be driven by a solenoid unit SOL2 depending on the selected operational mode of the copying machine 2. It is to be noted that, when the gate flapper 48 is in the clear position as shown, the copying paper Y can be passed from the fixing unit 32 directly towards the paper receiving tray 40 through the ejecting passage 41, but when it is in the deflecting position, the copying paper Y can be deflected so as to enter the first passage portion 42a. A similar gate flapper 44 is disposed for pivotal movement between clear and deflecting positions at the point where the first and second passage portions 42a and 42b are joined for ensuring the copying paper Y, then being conveyed from the third passage portion 42c towards the second passage portion 42b, to be guided into the second passage portion 42b. Again, a similar gate flapper 45 is disposed for pivotal movement between clear and deflecting positions at the point where the fourth passage portion 42d is branched off from the third passage portion 42c for assuredly guiding the copying paper Y into the fourth passage portion 42d. The gate flappers 44 and 45 are adapted to be driven by solenoids SOL3 and SOL4 according to the selected operational mode of the copying machine 2.

The ejecting passage 41 has a plurality of equally spaced delivery roller pairs 46A to 46C disposed therealong which are adapted to be driven by a motor M4 in synchronism with the copying operation performed by the copying machine 2.

At the junction between the first and second passage portions 42a and 42b, a drive roller 47A is disposed which is held in frictional contact with driven rollers 47B and 47C disposed on the first and second passage portions 47B and 47C, respectively. Thus, the copying paper Y moving along the first passage portion 42a can be transported from the ejecting passage 41 towards the third passage portion 42c. Further, the copying paper Y moving along the second passage portion 42b can be transported from the third passage portion 42c towards the ejecting passage 41.

At an upper end of the third passage portion 42c adjacent the junction between the first and second passage portions 42a and 42b, a reversing roller 48 is disposed and adapted to be driven by a motor M5 in one of the opposite directions. This reverses the copying paper Y, once introduced from the ejecting passage 41, into the third passage portion 42c and again into the ejecting passage 41 through the second passage portion 42b.

Similarly, at the junction between the third and fourth passage portions 42c and 42d, a drive roller 49A is disposed for rotation in a direction shown by the arrow. The roller 49A is held in frictional contact with driven rollers 49B and 49C disposed on the third and fourth passage portions 42c and 42d, respectively. Thus, the copying paper Y can be fed downwards along the third passage portion 42c and also upwards along the fourth passage portion 42d. At a position downwardly of the junction at which the fourth passage portion 42d is branched off from the third passage portion 42c, a reversing roller 50, adapted to be driven by a motor M6 in one of opposite directions, is disposed. The roller 50 reverses the copying paper Y, once moved further downwards past the nipping area between the drive and driven rollers 49A and 49B, so as to be guided into the fourth passage portion, 42d and then towards the intermediate tray 36 by utilization of a delivery roller pair 51 disposed along the fourth passage portion 42d.

The motors M4 to M6 and the solenoid units SOL2 to SOL4 are controlled, as to their operations, according to the position of the copying paper Y being moved along the ejecting passage 41 and the inverting passage 42. Because of this, detectors S1 to S4 operable to detect the passage of the copying paper Y are disposed adjacent an exit of the ejecting passage 41, an entrance to the first passage portion 42a, the rollers 49A and 49B in the third passage portion 42c and an exit of the fourth passage portion 42d.

In the above described construction, when the process (1) described above is desired to be performed, the gate flapper 43 is to be pivoted to the clear position to allow the copying paper Y to be transported from the fixing unit 32 towards the paper receiving tray 40 without being deflected into the first passage portion 42a.

Where the process (2) described above is desired to be performed, the gate flapper 43 and the gate flapper 4 are to be pivoted to the deflecting and clear positions, respectively, to allow the copying paper Y to be introduced into the first passage portion 42a and then into the third passage portion 42c. At this time, the gate flapper 45 is held in the clear position as shown by the phantom line in FIG. 2 so that the copying paper Y can be guided further downwardly of the third passage portion 42c by the rollers 49A and 49B and the roller 50. When a leading end of the copying paper Y being transported downwards has arrived at a position downwardly of the point at which the fourth passage portion 42d is branched off from the third passage portion 42c, the gate flapper 45 is driven so as to assume the deflecting position as shown by the solid line in FIG. 2. Further, at the same time, the drive motor M6 is reversed to rotate the roller 50 counterclockwise as viewed in FIG. 2. Thus, the copying paper Y conveyed downwards can be conveyed upwardly and then into the fourth passage portion 42d. Therefore, the copying paper Y entering the fourth passage portion 42d can be transported towards the intermediate tray 36. Subsequently, the copying paper Y is transported from the intermediate tray 36 to the transfer station 30 for receiving the powder image on the second side of the copying paper. It is then, after having been passed through the fixing unit 32, ejected onto the paper receiving tray 40 through the ejecting passage 41 in a manner similar to that during the process (1).

Where the copying paper Y is desired to be ejected onto the paper receiving tray 40 according to the process (3) described above, after the copying paper Y has been transported into the third passage portion 42c in a manner similar to that during the execution of the process (2), the gate flapper 44 is to be pivoted to the deflecting position as shown by the solid line in FIG. 2. The motor M5 is then to be reversed so as to rotate the roller 48 in a direction counterclockwise as viewed in FIG. 2 to permit the direction of transport of the copying paper Y to be reversed. This causes the copying paper Y to be guided from the second passage portion 42b into the ejecting passage 41 and then towards the paper receiving tray 40. It is to be noted that the length of a portion of the third passage portion between the junction of the first and second passage portions 42a, and 42b and the nipping region between the rollers 49A and 49B, is selected to be sufficiently greater than the length of the copying paper Y. Therefore, when the copying paper Y is transported into the third passage portion 42c with its upper end positioned downwardly of the junction of the first and second passage portions 42a and 42b, a lower end of the same copying paper Y will not be nipped between the rollers 49A and 49B.

Although the operating mode of the copying machine 2 varies, as will be described later in one of a plurality of operating modes, the illuminating device 17 is either held still at one of positions, shown by 52 and 53, respectively, which are aligned with the second and first illuminating stations 14 and 11, or moved at equal speed between a position, shown by 52, and a position shown by 54 in a direction shown by the arrow 54, to scan the document to be copied. In the vicinity of the positions 52 and 53, respective detectors S5 and S6 are disposed for detecting the illuminating means 17 for assuredly stopping the illuminating means 17 at said stop positions. Similarly, a similar detector S7 is disposed in alignment with a position, shown by 56, corresponding to one of the opposite ends of the stroke of movement of the illuminating means 17 which takes place when the document to be copied is placed on the transparent document support 5.

In order to transport the copying paper Y in synchronism with the electrostatic latent image formed on the photosensitive surface of the photoreceptor drum 26, detectors S8 and S9 are disposed in the supply passage 34A and a portion between the supply passage 34A and the resist rollers 35A and 35B, respectively. Also, similar detectors (not shown) are disposed in association with the supply passages 34B to 34D. Again, for detecting the copying paper Y drawn from the lowermost one of the copying papers within the intermediate tray 36 by the feed roller 39 and conveyed by a delivery roller 38E, a similar detector S10 is disposed in the supply passage 37. In addition, for detecting the copying papers Y within the intermediate tray 36, a detector S18 is utilized.

A detector S11 is disposed in the vicinity of an exit of the fixing unit 32 for detecting the passage of the copying paper Y through the fixing unit 32, which detector S11 provides an output signal that is used to control the rollers and the gate flappers disposed along the ejecting passage 42 and the inverting passage 42.

Figure 3:
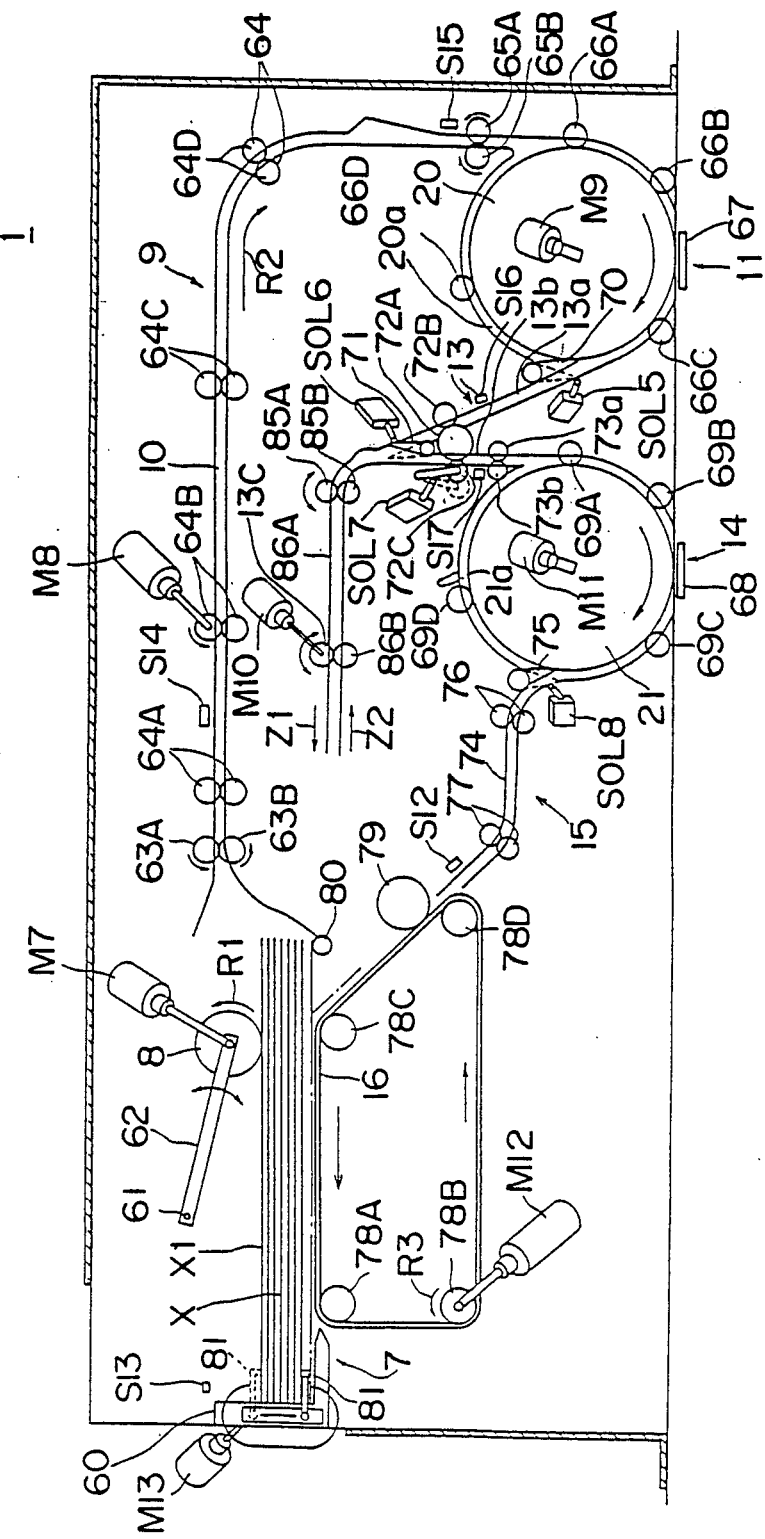
FIG. 3 is a schematic side sectional view showing a recirculating document feeding unit or recirculating document handler (RDH) used in the copying apparatus of FIG. 1.

FIG. 3 illustrates the details of the automatic document feeder unit 1 used in the copying apparatus shown in FIG. 1. Within the document hopper 2, a stack of sheet-like documents X having its first and second, opposite sides bearing respective images to be copied are accommodated one above the other in the order of their pages, with one and of said documents X being aligned by an end alignment member 60. The stack of the documents X, accommodated within the document hopper 2 rest on the endless delivery belt 16. In an order starting from the uppermost one of the documents X within the document hopper 2, the documents X are successively drawn out of the hopper 2 by means of the feed roller 8 onto the first delivery device 9.

The feed roller 8 is adapted to be driven by a motor M7 in a direction shown by the arrow R1 by a predetermined timing. During the rotation of the feed roller 8, the feed roller 8 is urged to the uppermost one X1 of the documents X within the hopper 2 by a lever 62 which is then angularly displaced about an pivot axis 61 by a solenoid unit (not shown). It is, however, to be noted that arrangement may be made that, when the uppermost sheet-like document X1 is to be fed out from the hopper 2, the feed roller 8 can be held in contact with the uppermost document X1 under the influence of a gravitational force acting on the roller 8.

In the vicinity of an entrance to the delivery passage 10 of the first delivery means 9, there is disposed a pair of ruffling rollers 63A and 63B for avoiding any possible feed of two or more documents at a time. The ruffling roller 63A is adapted to be driven in a direction conforming to the direction of delivery of the document towards the first document transport drum 20. Ruffling roller 64B is adapted to be driven in a direction opposite to the direction of rotation of the ruffling roller 63A at a speed lower than the speed of rotation of the ruffling roller 63A. In addition, the ruffling roller 63B is so selected so as to have a frictional force, between it and the document X, which is smaller than the frictional force between the ruffling roller 63A and the document X. Accordingly, the documents within the hopper 2 can be successively supplied into the delivery passage 10, assuredly one by one.

Along the delivery passage 10, roller pairs 64A to 64D are disposed in an equally spaced relationship with regard to each other. These roller pairs 64A to 64D are adapted to be driven by a motor M8 to feed the sheet-like document X along the delivery passage 10 in a direction shown by the arrow R2 while being sandwiched between rollers forming the roller pairs 64A to 64D.

In the vicinity of the exit end of the delivery passage 10 adjacent to the first illuminating station 11, a pair of resist rollers 65A and 65B are disposed. They are operatively coupled with a drive shaft (not shown) through a clutch CLT2 as will be described, with rotation of said resist rollers 65A and 65B being controlled by the clutch CLT2. More specifically, if the clutch CLT2 is in an ON state, and an OFF state, the resist roller 65A and 65B can be driven, and held still, respectively.

The ON/OFF control of the clutch CLT2 is controlled in correspondence to the operational mode of the copying machine 2 selected by the operator of the copying apparatus. In other words, where the sheet-like document X requires illumination, the resist rollers 65A and 65B are temporarily held still to halt the sheet-like document X for the purpose of synchronization with the recording paper Y and are subsequently driven to feed the sheet-like document X towards the first illuminating station 11 after it has been synchronized with the copying paper Y. On the other hand, where the sheet-like document X does not require illumination, the resist rollers 65A and 65B are driven at all times to allow the sheet-like document X to be passed without being held still.

The sheet-like document X conveyed by the resist rollers 65A and 65B is turned around the first document transport drum 20 disposed immediately above the first illuminating station 11 and is subsequently conveyed through a delivery passage 20a along the outer peripheral surface of the transport drum 20. The delivery passage 20a has a plurality of follower rollers 66A to 66D arranged circumferentially on, the first document transport drum 20 in equally spaced relationship with respect to each other so that, when the first document transport drum 20 is driven by a motor M9, the document X can be transported while sandwiched between the outer peripheral surface of such document transport drum 20 and the follower rollers 66A to 66D.

A top portion of the machine housing 3 where the first illuminating station 11 is defined is provided with the generally rectangular transparent glass 67 laid thereon with its longitudinal axis lying parallel to the axis of rotation of the first document transport drum 20. When consecutive portions of the radially outwardly oriented side of the sheet-like document X turned around the first document transport drum 20 are to be successively illuminated, the illuminating device 17 within the machine housing 17 is held still at the position 52, aligned with the first illuminating station 11.

The second document transport drum 21 is spaced a distance from the first document transport drum 20 and arranged immediately above the second illuminating station with its axis of rotation extending parallel to that of the first document transport drum 20. As is the case with the first illuminating station 14, a generally rectangular glass plate 68 is disposed at a position immediately below the second document transport drum 21 and in alignment with the second illuminating station 14, with its longitudinal axis lying parallel to the axis of rotation of the second document transport drum 21. A delivery passage 21a similar to the delivery passage 20a is defined radially outwardly of the second document transport drum 21 and includes a plurality of follower rollers 69A to 69D arranged circumferentially of the second document transport drum 21 in equally spaced relationship with respect to each other.

The second document delivery device 12, including the document inverting passage 13 for turning the document X upside down, is provided between the first and second document transport drums 20 and 21. The inverting passage 13 includes a first passage portion 13a branched off from a portion of the delivery passage 20a confronting the delivery passage 21a so as to extend diagonally upwardly, a second passage portion 13b adjoining the first passage portion 13a and a third passage portion 13c extending generally horizontally from the junction between the first and second passage portions 13a and 13b. The sheet-like document X can be guided from the delivery passage 20a into the third passage portion 13c through the first passage portion 13a and then from the third passage portion 13c into the delivery passage 21a through the second passage portion 13b wherefore the document X having the first side having been illuminated at the first illuminating station 11 can be turned upside down with the second side thereof illuminated at the second illuminating station 14.

At a location where the first passage portion 13a is branched off from the delivery passage 20a, a gate flapper 70 adapted to be driven by a solenoid unit SOL5 is disposed for pivotal movement between clear and deflecting positions for selectively guiding the sheet-like document X being transported along the delivery passage 20a into the first passage portion 13a when the gate flapper 70 is in the deflecting position. A similar gate flapper 71 adapted to be driven by a solenoid unit SOL6 is disposed for pivotal movement between clear and deflecting positions at the point where the first and second passage portions 13a and 13b are joined together so that, when the gate flapper 71 is in the deflecting position, the document X which has been transported to the third passage portion 13c can be guided into the second passage portion 13b.

In the vicinity of the junction between the first and second passage portions 13a and 13b, a roller 72A is disposed and held in contact with a roller 72B disposed in the first passage portion 13a. On one side of the roller 72A opposite to the roller 72B, a roller 72C adapted to be selectively brought into contact with the roller 72A by means of a solenoid unit SOL7 is disposed.

The sheet-like document X can be guided from the first passage portion 13a into the third passage portion 13c by means of the rollers 72A held in contact with the roller 72B. In the third passage portion 13c, reversible feed rollers 85A and 85B, 86A and 86B adapted to be driven by a drive motor M10 are disposed in spaced relationship with each other. The sheet-like document X can be first conveyed in a direction shown by the arrow Z1 during the rotation of the feed rollers 85A and 85B, 86A and 86B in one direction and, when a trailing end of the document X with respect to the direction of transport thereof has been moved past the junction between the first and second passage portions 13a and 13b. The feed rollers 85A and 85B, 86A and 86B are driven in the opposite direction to feed the document along the third passage portion 13c in the opposite direction shown by the arrow Z2 and then towards the second passage portion 13b. The document being moved towards the junction between the first and second passage portions 13a and 13b is, as the gate flapper 71 is then held in the deflecting position as shown by the solid line in FIG. 3, guided into the second passage portion 13b. Thus, the sheet-like document X can be transported within the second passage portion 13b by means of the delivery rollers 72A and 72C and subsequently guided into the delivery passage 21a.

A pair of resist rollers 73A and 73B drivingly coupled with a drive shaft (not shown) through a clutch CLT3 is disposed in the vicinity of the junction between the second passage portion 13b and the delivery passage 21a so that the rotation of the resist rollers 73A and 73B can be controlled by the clutch CLT3. More specifically, if the clutch CLT2 is in an ON state and an OFF state, the resist rollers 73A and 73B can be driven and held still, respectively. The ON/OFF control of the clutch CLT3 is controlled in correspondence to the operational mode of the copying machine 2 selected by the operator of the copying apparatus.

In other words, where the sheet-like document X requires illumination, the resist rollers 73A and 73B are temporarily held still to halt the sheet-like document X for the purpose of synchronization with the recording paper Y while temporarily interrupting the transport of the sheet-like document X and are subsequently driven to feed the sheet-like document X towards the second illuminating station 14 after it has been synchronized with the copying paper Y. On the other hand, where the sheet-like document X does not require illumination, the resist rollers 73A and 73B are driven at all times to allow the sheet-like document X to be guided into the delivery passage 21a without being held still. The solenoid unit SOL7 is controlled in dependence on the operation of the resist rollers 73A and 73B, that is, the ON/OFF control of the clutch CLT3.

The sheet-like document X conveyed by the resist rollers 73A and 73B is turned around the second document transport drum, 21 disposed immediately above the second illumination station 14, and is subsequently conveyed through the delivery passage 21a along the outer peripheral surface of the transport drum 21. The delivery passage 21a has a plurality of follower rollers 69A to 69D arranged circumferentially of the first document transport drum 20 in equally spaced relationship with respect to each other so that, when the second document transport drum 21 is driven by a motor M11, the document X can be transported while sandwiched between the outer peripheral surface of such document transport drum 21 and the follower rollers 69A to 69D. In this way, consecutive portions of the sheet-like document X turned around the second document transport drum 21 can be successively presented to the second illuminating station 14 for receiving rays of light emitted from the illuminating device 17 then held still at the position 53 immediately below the second illuminating station 14.

The third delivery means 15 includes a delivery passage 74 branched off from the delivery passage 21a so as to guide the document X from the delivery passage 21a towards the feed belt 16. At a position adjacent the point where the delivery passage 74 is branched off from the delivery passage 21a, a gate flapper 75 adapted to be driven by a solenoid unit SOL8 between clear and deflecting positions is disposed for selectively introducing the document X into the delivery passage 74. The delivery passage 74 has roller pairs 76 and 77 spaced apart from each other and adapted to be driven to feed the document towards the feed belt 16 along the delivery passage 74.

The feed belt 16 is trained around drive rollers 78A to 78D which are so arranged that respective axes of rotation of these rollers 78A to 78D can occupy four corners of the rectangular shape, the drive roller 78B being drivingly coupled with a motor M12 so as to be driven in a direction shown by the arrow R3 with the bent 16 driven in the direction shown by the arrow. In the vicinity of an exit of the third delivery means 15 remote from the second document transport drum 21, a detector S12 is disposed for detecting a leading end of the document X with respect to the direction of transport thereof towards the document hopper 7, which detector S12 provides an output necessary to selectively power on and off the motor M12. A document drawing roller 79 is disposed at a position adjacent the exit of the delivery passage 74 and held in contact with the belt 16. The document introduced into the delivery passage 74 can be fed towards the document hopper 7 while sandwiched between the belt 16 and the document drawing roller 79 and is then inserted in between the belt 16 and the lowermost one of the sheet-like documents X within the document hopper 7.

To facilitate the insertion of the document X, delivered along the delivery passage 74 towards the document hopper 7, in between the belt 16 and the lowermost one of the documents X within the document hopper 7, a kick-up roller 80 is disposed generally beneath the entrance to the delivery passage 10, which kick-up roller 80 is operable to lift rear ends of the documents X within the hopper 7 upwardly to allow the leading end of the document from the delivery passage 74 to squeeze in between the belt 16 and the lowermost one of the documents X within the document hopper 7. The drive motor M12 is brought to a halt at the moment the leading end of the sheet-like document X being delivered by the belt 16 has arrived at the end alignment member 60.

The document hopper 7 is provided with a detecting actuator 81 for detecting a complete recirculation of the sheet-like document X from the document hopper 7 back to the document hopper 7 through the first and second illuminating stations 11 and 14. This detecting actuator 81 is held in a lowered position as shown by the solid line in FIG. 3 before the sheet-like document X is placed within the document hopper 7, and the operator of the copying apparatus may place one or more sheet-like documents X above the detecting actuator 81 then in the lowered position. The sheet-like documents X having been successively passed through the first and second illuminating stations 11 and 14 are successively fed back to the document hopper 7 by the belt 16 in the manner as hereinbefore described with the detecting actuator 81 consequently shifted upwards by the progressively increasing number of the sheet-like documents fed back to the document hopper 7. After the whole number of the sheet-like documents X have been completely recirculated from the hopper 7 back t the hopper 7 through the first and second illuminating stations 11 and 14, the detecting actuator 81 assumes an elevated position shown by the phantom line in FIG. 3, the arrival of the detecting actuator 81 at the elevated position being subsequently detected by a detector S13. The detector S13 when detecting the arrival of the detecting actuator 81 at the elevated position provides an output which is used to control the operation of the copying machine as will be described later. Also, when the detecting actuator 81 arrives at the elevated position, an actuator drive motor M13 is energized to rotate the actuator 81 through an angle of 360° to return to the lowered position.

In the delivery passage 10, a detector S14 for the passage of the sheet-like document X is disposed at a position downstream of the ruffling rollers 63A and 63B with respect to the direction of feed of the document X towards the illuminating station 11, which detector S14 provides an output used to selectively energize and deenergize the motor M8. A detector S15 is also provided along the delivery passage 10 at a position upstream of the resist rollers 65A and 65B adjacent the first document transport drum 20, which detector S15 is used t detect the leading end of the document X being passed through the delivery passage 10 for controlling the motor M8 and also for controlling the ON and OFF states of the clutch CLT2 provided for the resist rollers 65A and 65B.

In the document inverting passage 13 of the second document delivery means 12, a detector S16 is disposed in the first passage portion 13a for providing an output used to control the motor M10 and also for controlling the solenoid SOL6. In this way, the reversing operation of the document X can be realized.

Again, a detector S17 is disposed at a position upstream of the resist rollers 73A and 73B in the second passage portion 13*b* adjacent the second document transport drum 21 with respect to the direction of transport of the sheet-like document X. Both of the solenoid SOL7 and the clutch CLT3 provided for the resist rollers 73A and 73B are controlled in response to an output from the detector S17.

The copying machine 2 of the above described construction including the automatic document feeder unit 1 can have, for example, the following modes of operation which are accomplished by circulating the plural sheet-like documents through a number of times.

(A) SIMPLEX-SIMPLEX mode: The mode of operation in which a plurality of sorted simplex-copied sheets, that is, a plurality of sorted copies each having a copied image born on one side thereof, can be obtained from a simplex document, that is, the document having an original image born only on one side thereof.

(B) SIMPLEX-DUPLEX mode: The mode of operation in which a plurality of sorted duplex-copied sheets, that is, a plurality of sorted copies each having a copied image born on both sides thereof, can be obtained from a simplex document.

(C) DUPLEX-SIMPLEX mode: The mode of operation in which a plurality of sorted simplex-copied sheets, that is, a plurality of sorted copies each having a copied image born on one side thereof, can be obtained from a duplex document, that is, the document having an original image born on both sides thereof.

(D) DUPLEX-DUPLEX mode: The mode of operation in which a plurality of sorted duplex-copied sheets can be obtained from a duplex document.

It is also possible to make a plurality of copies during one complete circulation of the sheet-like document X while the sheet-like document is turned around the firs and/or second document transport drums 20 and 21 during the illumination effected by means of the illuminating device 17.

Figure 4:
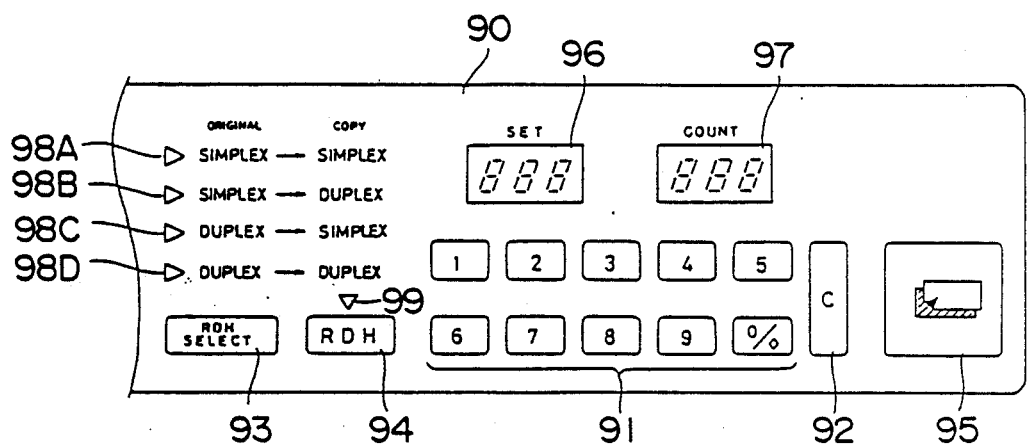
FIG. 4 is a schematic top plan view of a control panel disposed on a machine housing of the copying apparatus of FIG. 1.

FIG. 4 illustrates a top plan view of a control panel 90 disposed on, for example, the top of the machine housing 3. The control panel 90 includes a tens keyboard 91 for setting the number of copies desired to be made, a clear key 92, a copy mode selecting key 93 for setting a copying condition, an RDH select key 94 for selectively activating and inactivating the automatic document feeder unit 1, a print switch 95 for instructing the start of a copying operation, a preset number display unit 96 for displaying the number of copies set by the tens keyboard 91. It further contains a copy number display unit 97 for displaying the number of copies being actually made, mode display units 98A, 98B, 98C and 98D which are selectively activated to show the mode of operation selected for the copying machine to execute, and an RDH mode display unit 99. The mode display units 98A to 98D and the RDH mode display unit 99 can be realized by the use of light emitting diodes which are adapted to be energized to emit light when appropriate modes are selected.

As clearly shown in FIG. 4, the mode display units 98A to 98D correspond respectively to the SIMPLEX-SIMPLEX, SIMPLEX-DUPLEX, DUPLEX-SIMPLEX and DUPLEX-DUPLEX modes referred to hereinbefore, and the light emitting diodes (not shown) of the respective mode display units 98A to 98D can be selectively and sequentially energized in the order from top to bottom each time the mode selecting key 93 is depressed. However, when the mode selecting key 93 is depressed while the light emitting diode of the mode display unit 98D is energized, the mode display unit 98A is energized to show that the machine is set in the SIMPLEX-SIMPLEX mode.

The automatic document feeder unit 1 can be activated when the RDH mode display unit 99 is energized by the depression of the RDH select key 94, but can be inactivated when the RDH mode display unit is deenergized. More specifically, when the operator places the document such as, for example, a book, on the document support 6 to make a copy of an image of a page of the book on a copying paper Y, the operator has to depress the RDH select key 94 to deenergize the RDH mode display unit 99. On the other hand, where a copy is desired to be made with the use of the automatic document feeder unit 1 for transporting the sheet-like document X, the operator has to depress the RDH select key 94 to energize the RDH mode display unit 99.

Where the automatic document feeder unit 1 is utilized, the operator manipulates the copy mode selecting key 93 to set the machine in one of the operational modes as hereinbefore described, followed by the manipulation of the tens keyboard 91 to set the number of copies desired to be made which is displayed by the preset number display unit 96. Subsequent depression of the print switch 95 after the manipulation of the tens keyboard 91 results in both of the automatic document feeder unit 1 and the copying machine 2 to cooperate with each other to initiate the copying operation. At this time, the number of copies actually made is progressively displayed by the copy number display unit 97, and when the number of copies displayed by the copy number display unit 97 and the number of copies displayed by the preset number display unit 96 coincide with each other, the copying machine 2 is brought to a halt with the preset number display unit 96 consequently reset to zero. It is to be noted that the number of copies displayed in the copy number display unit 97 is retained as displayed unless the print switch 95 is subsequently depressed.

Figure 5:
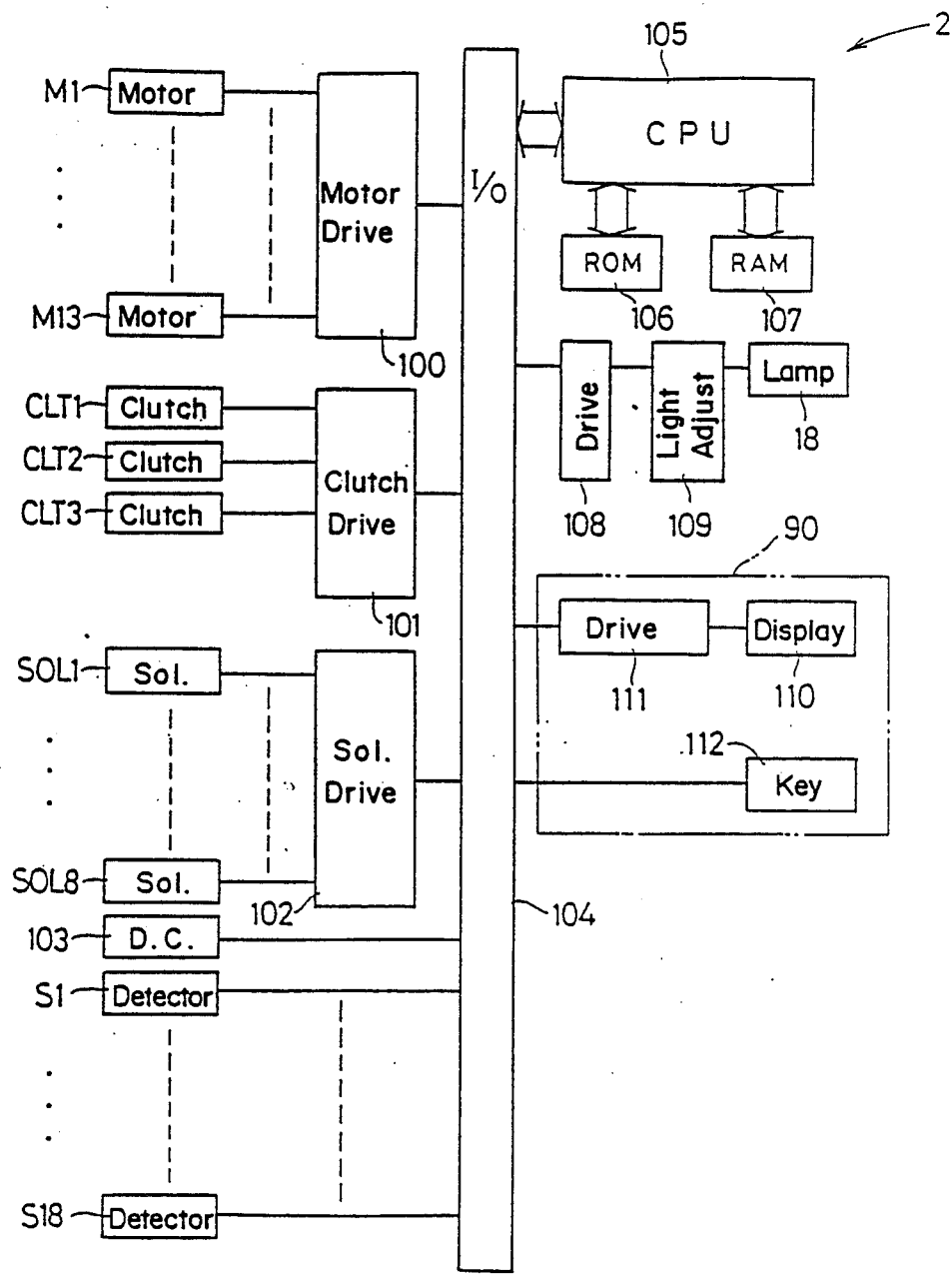
FIG. 5 is a circuit block diagram showing an electric circuitry used in the copying apparatus of FIG. 1.

FIG. 5 illustrates a circuit block diagram showing electric circuitry used in the copying machine 2. The motors M1 to M13 referred to hereinbefore are electrically connected with a motor drive circuit 100, the clutches CLT1 to CLT3 referred to hereinbefore are electrically connected with a clutch drive circuit 101, and the solenoid units SOL1 to SOL8 are electrically connected with a solenoid drive circuit 102. These drive circuits 100 to 102 and control elements such as a direct current power source 103, which are used for the document transport control. The recording paper supply control and the control of various processing units disposed around the photoreceptor drum are electrically connected with an interface circuit (I/O) 104. To this interface circuit 104 is connected the detectors S1 to S18 and a microcomputer (CPU) 105. Respective outputs from the detectors S1 to S18 are supplied to the microcomputer 105 through the interface circuit 104 so that the microcomputer 105 can perform an arithmetic operation appropriate to the outputs from the detectors to provide drive control signals to the various drive circuits 100 to 102 through the interface circuit 104.

The microcomputer 105 is connected with a read-only memory (ROM) 106 and a random access memory (RAM) 107. The microcomputer 105 performs a control operation using the random access memory 107 as a work area on the basis of a control program stored in the read-only memory 106.

The interface circuit 104 is also connected through a drive circuit 108 with a light adjusting unit 109 for biasing or supplying an electric power to the lamp 18 forming a part of the illuminating device 17 and through a display drive circuit 111 with a display device 110 including the various display units 96, 97, 98A to 98D and 99 on the control panel 90. The interface circuit 104 is further connected with a keyboard device 112 including the various keys 91, 92, 93, 94 and 95 referred to above for the manipulation by the operator of the copying apparatus.

Hereinafter, the operation of the component parts of the copying apparatus during any one of the operational modes will be described with particular reference to FIGS. 1 to 5. When the RDH select key 94 on the control panel 90 is manipulated to energize the RDH mode display unit 99 and the copy mode selecting key 93 is manipulated t energize the copy mode display unit 98A, the SIMPLEX-SIMPLEX mode can be selected. Thereafter, the operator has manipulated the tens keyboard 91 to set the number of copies desired to be made and then depress the print switch 95. Unless the copying operation is performed, the illuminating device 17 is held at the position 52. This can be accomplished by the employment of an arrangement wherein a drive means (not shown) for the optical system including the illuminating device 17 is not energized when and so long as the detector S5 is in position to detect the illuminating means 17.

A stack of simplex documents each having an original image born only on one side thereof arranged in the order of their pages are placed within the document hopper 7 with both of the original image and the youngest page oriented upwards. In this condition, the documents X can be successively drawn by the feed roller 8 from the uppermost one of them into the first delivery means 9 and are subsequently passed through the first illuminating station 11 with consecutive portions of each document being scanned by the illuminating device 17. The document X having been presented to the first illuminating station 11 is, after having been guided into the inverting passage 13 of the second delivery device 12, turned around and transported by the second transport drum 21 towards the belt 16 by way of the third delivery device 15 and is then fed by the belt 16 to the document hopper 7 with the document X being inserted in between the lowermost one of the documents within the hopper 7 and the belt 16 while the imaged side oriented upwards. This cycle of circulation is repeated a number of times equal to the number of the sheet-like documents X placed within the document hopper 7 and each of the original documents X within the document hopper 7 can be circulated through a number of times equal to the number of copies desired to be made.

At this time, the illuminating device 17 is held still and, hence, fixed at the position 52 aligned with the first illuminating station 11. Within the machine housing 3, each copying paper Y is drawn out from, for example, the paper supply cassette 32A into the paper feed passage 34A and then to the transfer station 30 after having been synchronized by the resist rollers 35A and 35B with the conveyance of the sheet-like document X. After the powder image on the photoreceptor drum 26 has been transferred at the transfer station 30 onto the copying paper Y, the copying paper Y is transported through the fixing unit 32. The powder image on the copying paper Y is permanently fixed, and is guided into the first passage portion 42a. Then the second passage portion 42c and finally the third passage portion are passed, thus emerging onto the paper receiving tray 40 with the copying paper having been turned upside down. In this way, the copying papers Y having copied image oriented downwards are successively stacked on the paper receiving tray 40.

The solenoid unit SOL1 is energized for a predetermined length of time each time the complete circulation of each document X has been detected, to thereby shift the paper receiving tray 40 in a direction perpendicular to the plane of the drawing of FIG. 1. After the circulation of the document X having taken place a number of times, the copying papers Y each having one side formed with the image of the original document are successively piled up on the paper receiving tray 40.

Where the SIMPLEX-DUPLEX mode is desired to be set in the copying apparatus, the operator has to manipulate the mode selecting key 93 to energize the copy mode display unit 98B on the control panel 90. At this time, the illuminating device 17 is held still at the position 52 so that the illuminating device 17 can be detected by the detector S5. In this condition the sheet-like documents X are successively transported in a manner similar to that during the SIMPLEX-SIMPLEX mode.

Within the machine housing 3, the copying paper Y is drawn out from, for example, the paper supply cassette 32A towards the transfer station 30 where the powder image carried by the photoreceptor drum 26 can be transferred onto the copying paper Y. The copying paper Y having the powder image transferred thereto at the transfer station 30 is subsequently conveyed through the fixing unit 32 and then towards the intermediate tray 36 through the passage portions 42a, 42c and 42d. The copying paper Y so supplied to the intermediate tray 36 is subsequently drawn by the feed roller 39 out of the intermediate tray 36 and fed towards the transfer station 30 through the feed passage 37.

Of the original images born on the documents, the original image on each of the odd-numbered documents in the stack within the document hopper 7 is copied on the copying paper supplied from the paper supply cassette 32A and the original image on each of the even-numbered documents in the stack within the document hopper 7 is copied on the copying paper supplied form the intermediate tray 36. Accordingly, after the original image on, for example, the first document X, has been copied on the copying paper Y supplied from the paper supply cassette 32A, the next succeeding document X is held still. It is held, temporarily at a position adjacent the resist rollers 65A and 65B until the recording paper Y having the image on the first document copied thereon is transported to the intermediate tray 36 it is then sent to a nipping position between the resist rollers 35A and 35B. When the recording paper Y is guided from the intermediate tray 36 to the nipping position between the resist rollers 35A and 35B, the drive shaft is coupled with the resist rollers 65A and 65B through the clutch CLT2, whereby the next succeeding document X can be turned around and transported by the first transport drum 20 with consecutive portions thereof scanned by the illuminating device 17 at the first illuminating station 11.

The copying paper Y transported to the nipping position between the resist rollers 35A and 35B is subsequently transported to the transfer station 30 in synchronism with the arrival of the powder image on the photoreceptor drum 26 at the transfer station. The powder image is then transferred onto one of the sides of the copying paper Y opposite to the side where the image of the first document has been copied. Thereafter, the copying paper Y is transported through the fixing unit 32 at which time the powder image is permanently fixed. It is then guided into the inverting passage 42 for turning the copying paper Y upside down so that the copying paper Y can be subsequently ejected onto the paper receiving tray 40 through the ejecting passage 41.

This operation takes place repeatedly for a number of times, equal to the number of the documents X placed on the document hopper 7 until all of the number of the documents X have been, circulated in the manner as hereinabove described. Therefore, copying papers each having the opposite sides formed with the images corresponding to the original images on one side of each neighboring documents in the stack within the document hopper 7 can be obtained.

During the DUPLEX-SIMPLEX mode, the illuminating device 17 is moved from the position 52 to the position 53 after the consecutive portions of one side of the sheet-like document X have been scanned at the first illuminating station 11 by the illuminating device 17 then held at the position 52 so that consecutive portions of the opposite side of the same document X can be scanned at the second illuminating station 14 by the same illuminating device 17. At this time, within the machine housing 3, the copying paper Y are successively drawn out from, for example, the paper supply cassette 32A, and transported towards the transfer station 30 in synchronism with the arrival of the powder image on the photoreceptor drum 26 at the transfer station 30. After the powder image has been transferred onto the copying paper Y at the transfer station 30, the copying paper is passed through the fixing unit 32 for permanently fixing the powder image on the copying paper Y and is then guided into the inverting passage 42 so that the copying paper Y can be turned upside down prior to the copying paper Y being ejected onto the paper receiving tray 40 through the ejecting passage 41.

This operation takes place repeatedly until the whole number of the documents X within the document hopper 7 have been circulated in the manner as hereinabove described and, therefore, copying papers each having only one side formed with the image on any one of the opposite sides of each documents in the stack within the document hopper 7 can be obtained. Specifically, according to the DUPLEX-SIMPLEX mode, the images on the respective sides of each document X can be copied on one side of any one of the copying papers Y and, therefore, two copies having been made correspond to one duplex document.

During the DUPLEX-DUPLEX mode, the sheet-like documents are successively transported in a manner similar to that during the DUPLEX-SIMPLEX mode.

When the consecutive portions of one side of the document X are successively presented to the illuminating station and, hence, scanned by the illuminating device 17, the copying papers Y successively drawn out from, for example, the paper supply cassette 32A in the order from the uppermost one of them are transported to the transfer station 30 while guided by the resist rollers 35A and 35B. In this way, the document X and the copying paper Y are transported so as to have a predetermined synchronized relationship with each other so that the image on each side of the document X can be copied on a corresponding side of copying paper Y.

The copying papers Y, after the copies are successively transported from the fixing unit 32 towards the intermediate tray 36 through the passage portions 42a, 42c and 42b of the inverting passage 42, are piled up on the intermediate tray 36. At this time, each of the copying papers Y is placed on the intermediate tray 36 with the copied image on one side thereof oriented upwards.

After the complete circulation of all of the documents X placed within the document hopper 7, the illuminating device 17 is moved to and fixed at the position 53 shown by the solid line in FIG. 1. Thereafter, the documents X in the document hopper 7 are successively transported with consecutive portions of the image on the opposite side of each document successively presented to the second illuminating station 14 and, hence, scanned by the illuminating device 17 that is held still at the position 53.

On the other hand, the recording papers Y stacked in the intermediate tray 36 are fed out of the intermediate tray 36 one by one in the order from the lowermost one of them and are successively introduced into the feed passage 37. In other words, in the order of the recording papers Y each having the image copied on one side thereof, the recording papers Y are successively fed out of the intermediate tray 36. In this way, each recording paper Y so fed out of the intermediate tray 36 can be transported to the transfer station 30 by the action of the resist rollers 35A and 35B in synchronism with the arrival of the powder image on the photoreceptor drum 26 at the transfer station 30.

Thereafter, the recording paper Y having passed through the fixing unit 32 is sequentially passed through the passage portions 42a, 42c and 42d of the inverting passage 42 so that the copying paper Y can be ejected onto the paper receiving tray 40 having been turned upside down.

The above described operation is continued until the consecutive portions of the opposite sides of each document X are successively presented to the second illuminating station 14 and, hence, scanned by the illuminating means 17 held still at the position 53. As a result thereof, the copying papers each having its opposite sides copied with the images on the respective sides of each document in the same layout can be obtained on the paper receiving tray 40.

When a similar operation is carried out through a number of times, and the solenoid unit SOL1 is driven each time to shift the paper receiving tray 40 in the direction perpendicular to the plane of the drawing of FIG. 1, the plural copies each having images copied on the opposite sides can be obtained in a form as sorted.

It is to be noted that such an operation can be realized by causing the document X to travel within the delivery passage 20a about the axis of rotation of the transport drum 20 through a number of times equal to the number of copies to be made with one side of the document presented to the first illuminating station 11 so that the recording papers in the intermediate tray 36 can be successively transported to the transfer station 30 while the illuminating device 17 has been moved to the second illuminating station 14 after the presentation of that one side of the document to the first illuminating station 11 through said number of times.

By way of example, where the document is of a type that cannot be fed by the use of the automatic document feeder unit 1 such as, for example, pages of a book, desired to be copied, such document is to be placed on the document support 5 with an image side of the document oriented downwards. The document is then subsequently pressed against the document support 5 by utilization of the presser plate 6. At this time, the operator of the copying apparatus must manipulate the RDH select key 94 on the control panel 60 to deenergize the RDH mode display unit 99. Subsequently, the tens keyboard 91 has to be manipulated to set the number of copies desired to be made, followed by the depression of the print switch 95.

It is to be noted that the print switch 95 is depressed, the illuminating device 17 is held still at the position 52. Depression of the print switch 95 results in the movement of the illuminating device 17 in the direction shown by the arrow 55 at a speed which attains a predetermined scanning speed before the illuminating device 17 moves past the position 56. Accordingly, the illuminating device 17 moves at equal speed between the positions 56 and 54 whereby an equal speed scanning of the image side of the document placed on the document support 5 can be realized.

The recording paper Y is supplied from, for example, the paper supply cassette 32A, and the transport thereof can be controlled on the basis of the output from the detector S7. In this way, the image to be copied can be copied on a desired area of the recording paper Y.

The recording paper Y, having the image copied thereon, can be ejected onto the paper receiving tray 40 through the ejecting passage 41 without being introduced into the inverting passage 42. In other words, since the image on the document is simplex in this case, and since the copying papers Y having similar images copied thereon are stacked on the paper receiving tray 40, none of these copying papers Y is required to be turned upside down.

In the foregoing embodiment of the present invention, the illuminating device 17 is normally held and fixed at the position 52. Also, the scan start position from which the illuminating device 17 starts its scanning movement in the case where the document is placed on the document support 5 so that it can be scanned by the moving illuminating device 17, coincides with the position 52. In other words, the position 52 concurrently serves as the scan start position. Accordingly, since there is no possibility that illuminating device 17 will be moved incident to the depression of the manipulation of the RDH select key 94 on the control panel 60, the service life of the drive device for the optical system including the illuminating device 17 can be advantageously improved. Moreover, since the position at which the illuminating device 17 is normally held still, and the scan start position are identical with each other, only one detector S5 suffices to detect the positioning of the illuminating device 17 at such position. Therefore, the number of the detectors required can be advantageously minimized, making it possible to manufacture the copying apparatus in a relatively compact size.

Figure 6:
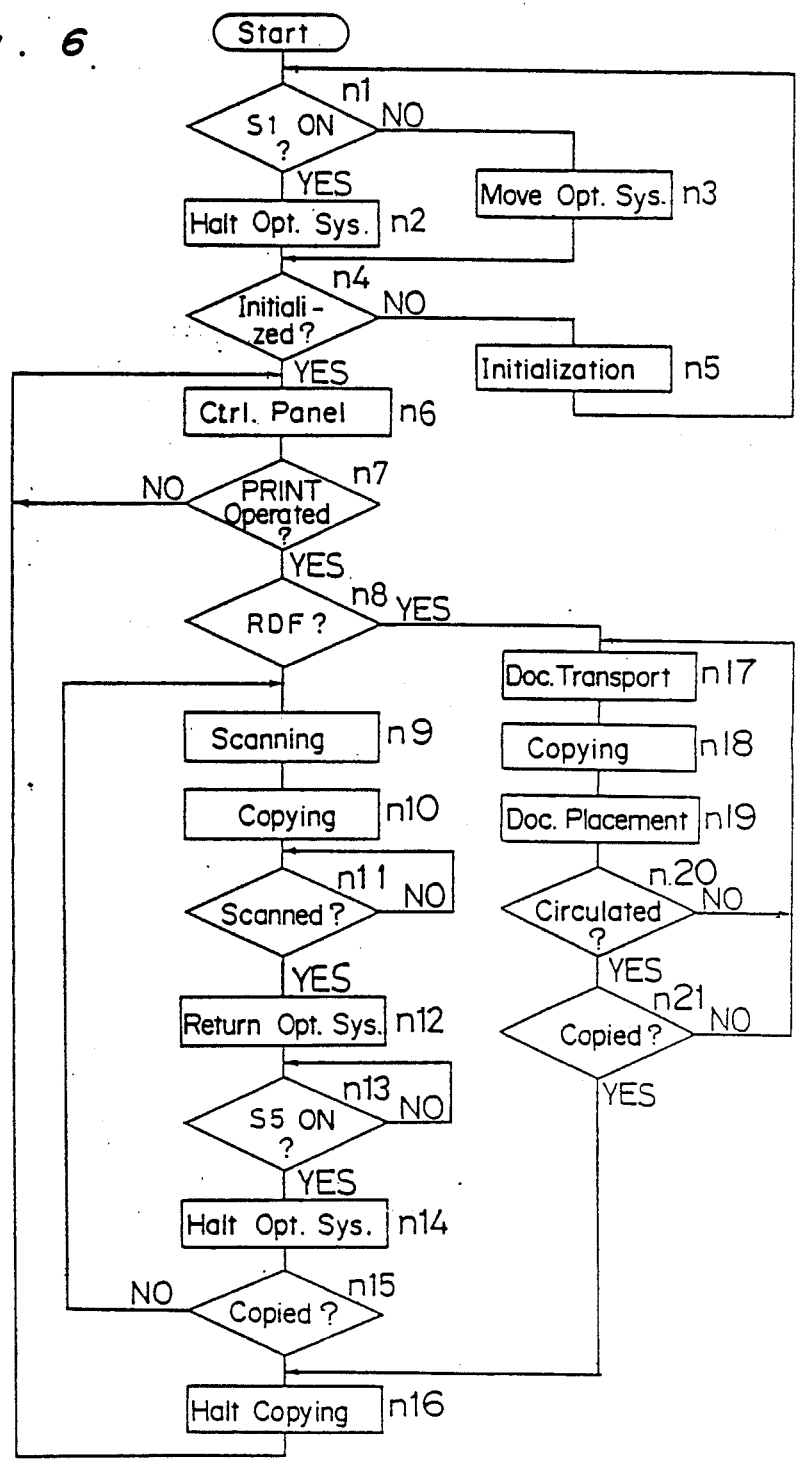
FIG. 6 is a flowchart showing the sequence of operation of the copying apparatus embodying the present invention.

The sequence of operation of the copying apparatus embodying the present invention will now be described with particular reference to the flowchart of FIG. 6. When and after the machine has been electrically powered with the main switch turned on, a decision step n1 takes place to determine if the detector S5 for detecting the positioning of the illuminating device 17 at the position 52 is in position to detect the illuminating device 17. If the detector S5 fails to detect the illumination device 17 at the position 52, the program flow proceeds to a "Move Opt. Sys." step n3 at which the optical system including the illuminating device 17 and the reflecting mirrors 22 to 25 is driven, followed by a decision step n4. On the other hand, if the detector S5 detects the illuminating device 17 at the position 52, the optical system is halted at the position 52 at step n2, followed by the decision step n4.

At step n4, a decision is made to determine if initialization required for the copying operation to take place has been effected. This initialization includes the heating of the fixing unit 32 to a required temperature, and initial setting of various processing units disposed around the photoreceptor drum 26. Should the result of decision at step n4 indicate that the initialization has not been effected, the program flow proceeds to step n5 at which the initialization is effected, followed by the return of the program flow to the decision step n1. On the other hand, should the result of decision at step n4 indicate that the initialization has been affected, a "Ctrl Panel" step n6, takes place. The operator of the the copying machine then manipulates the control panel 90 to effect various settings including the setting of the number of copies desired to be made and the setting of one of the modes or alteration thereof.

Thereafter, at step n7, a decision is made to determine if the print switch 95 has been manipulated. If the print switch 95 has not been manipulated, the program flow returns to the previous step n6. However, if the print switch 95 has been manipulated, the program flow proceeds to the subsequent step n8.

At step n8, a decision is made to determine if the copying apparatus is set in an RDH mode in which the recirculating automatic document feeder unit 1 is utilized. If the result of decision at step n8 indicates the setting of the apparatus in the RDH mode, the program flow proceeds to a "Doc. Transport" step n17. However, if it does not indicate the setting of the apparatus in the RDH mode, the program flow proceeds to the next succeeding step n9.

At the step n9, the illuminating device 17 is driven to scan the document placed on the document support 5. Consequent upon the scan of the document on the document support 5 by the illuminating device 17, the processing units disposed around the photoreceptor drum 26 are activated at step n10 to effect an actual copying operation with the copying paper Y transported to the transfer station 30 for receiving the powder image from the photoreceptor drum 26.

At step n11, a decision is made to determine if the optical system has been moved, that is, if the illuminating device 17 has been moved to the position 54. Should the illuminating device 17 have been moved to the position 54, it means that the document has been scanned and, therefore, the program flow proceeds to step n12 at which the optical system is returned to the initial position, that is, the illuminating device 17 is returned to the position 52.

Then, at step n13, a decision is made to determine if the illuminating device 17 is detected by the detector S5. If the detector S5 detects the illuminating device 17 at the position 52, the program flow proceeds to step n14 at which the optical system is brought to a halt. This is followed by a decision step n15 at which a decision is made to determine if the copying operation has been performed repeatedly enough to make the preset number of copies desired to be made. Unless the desired number of copies have been made, the program flow from step n9 to step n15 is repeat. However, if the desired number of copies have been made, the program flow proceeds to step n16. Thereafter, the copying operation is interrupted at step n16, with the program flow returning to step n6.

Referring back to the decision step n8, if the result of the decision at step n8 indicates the setting of the apparatus in the RDH mode, the program flow proceeds to a "Doc. Transport" step n17 at which the document X is transported by the circulating automatic document feeder unit 1 so that consecutive portions of the document X moving successively past the illuminating station 11 or 14 can be successively scanned by the illuminating device 17. In synchronism with therewith, the processing units around the photoreceptor drum 26 are activated to accomplish the copying operation at step n18, followed by step n19 at which the document X is returned to the document hopper 7 from below.

At the subsequent decision step n20, a decision is made to determine whether or not the document X has been completely circulated from the document hopper 7 back to the document hopper 7 past the first and second illuminating stations 11 and 14. Should the result of decision at step n20 indicate that the document X has not yet been, circulated, the program flow return to step n17. However, should it indicate that the document X has been circulated, a decision is made at step n21 to determine if the copying operation has been performed to produce the number of copies the operator has set in the machine. If the desired number of copies have not yet been made, the program flow return to step n17. However, if the desired number of copies have been already made, the program flow proceeds to step n16 at which the copying operation is interrupted.

As hereinbefore described in detail, according to the present invention, where the document is placed on the document support 5 so that the document can be scanned by the optical system including the illuminating device 17, the scan start position from which the optical system starts its scanning motion is rendered to be the position 52 aligned with the first illuminating station 11. Therefore, the frequency of movement of the optical system can be advantageously reduced along with the minimization of the number of the detectors used in the copying machine embodying the present invention.

In the foregoing embodiment of the present invention, reference has been made to the use of the detectors S5 and S6 for detecting the illuminating device 17 so that the illuminating device 17 can be assuredly held still at the positions aligned with the first and second illuminating stations 11 and 14, respectively. However, in the following preferred embodiment of the present invention, instead of the use of the detectors for detecting the illuminating device 17, arrangement has been made that the movement of the illuminating device 17 along an upper surface of the machine housing 3 can be blocked mechanically to hold the illuminating device 17 at the desired position.

Figure 7:
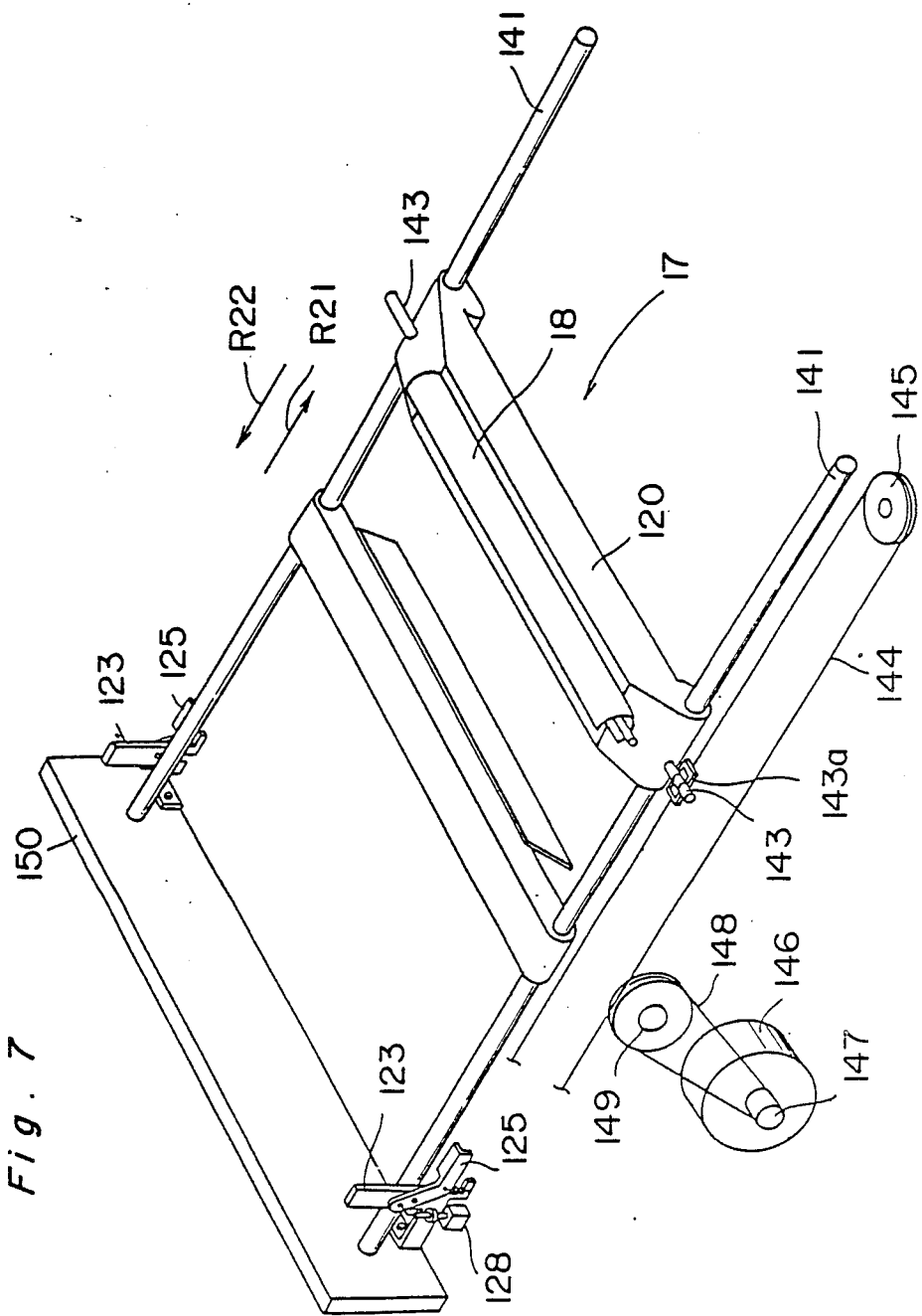
FIG. 7 is a perspective view, on an enlarged scale, of a system for carrying and repositioning an illuminating means used in an another preferred embodiment of the present invention.

Referring now to FIG. 7, there is shown a structure necessary to fixedly hold the illuminating device 17 at the position shown by 53 in FIG. 1. The illuminating device 17 shown therein comprises a generally elongated carriage 120 having the light source 18 and the reflecting mirror 19 both mounted thereon. This carriage 120 is movably mounted on a pair of guide rails 141 supported by a chassis 150 so as to extend in a direction parallel to the direction of scanning motion of the illuminating device and in a direction perpendicular to the longitudinal sense of the illuminating device 17. In this way, the carriage 120 is capable of reciprocating along the guide rails 141 in opposite directions shown by the arrows R21 and R22, respectively.

The carriage 120 has rods 143 secured to opposite ends thereof so as to extend in a direction parallel to the longitudinal axis of the carriage 120, at least one of said rods 143 being rigidly connected through a fixture 143a to a cable 144 trained between spaced apart pulleys, only one of which is shown by 145, so as to extend parallel to any one of the guide rails 141. The cable 144 has a generally intermediate portion thereof turned around a pulley 149 which is drivingly coupled with a drive shaft 147 of a drive motor 146 through an endless drive belt 148. This is, during the rotation of the drive motor 146, the cable 144 can pull the carriage 120 in one of the opposite directions R21 and R22 depending on the direction of rotation of the drive motor 146.

The rotation of the drive motor 146 is controlled in dependence on the scanning speed of the illuminating device 17 at which the latter scans the document placed on the document support 5, and the position at which the illuminating device 17 is held still.

Figure 8:
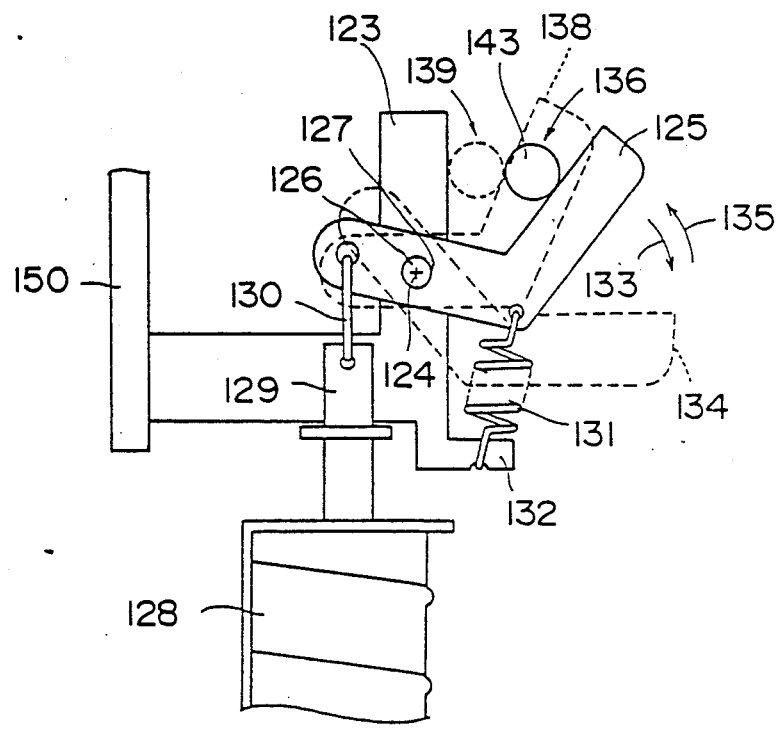
FIG. 8 is a schematic side view of a principle portion of the system shown in FIG. 7.

For each of the guide rails 141, a positioning member 123 is fixedly secured to the chassis 150 at a position corresponding to the second illuminating device 17, the details of each positioning member 123 being shown in FIG. 8.

As shown in FIGS. 7 and 8, each positioning member 123 is of a generally L-shaped configuration and carries a generally L-shaped fixing lever 125 pivotally mounted thereon and having first and second arms. Specifically, each positioning member 123 has a boss 126 secured thereto, or otherwise formed integrally therewith, at a location adjacent the bent portion thereof. Further said fixing lever 125 has the first arm pivotally mounted on the boss 126 so that the fixing lever 125 can undergo a pivotal movement about the longitudinal axis 124 of the boss 126. A free end of the first arm of the fixing lever 125 is operatively coupled through a drive transmitting member 130 with an actuator 129 adapted to be driven by a solenoid unit 128.

The fixing lever 125 is normally biased clockwise, as shown by the arrow 133 and as viewed in FIG. 8, about the boss 126 by the action of a biasing spring 131 having one end secured to a bent portion of the fixing lever 125 and the other end engaged to a stay 132. This stay 132 is formed integrally with the respective positioning member 123 so as to protrude outwardly from the bent portion of the respective positioning member 123 in a direction conforming to the direction shown by the arrow R21 in FIG. 7. Thus, it will readily be seen that, unless the solenoid unit 128 is energized, the fixing lever 125 assumes a position shown by the phantom, line 134 by the action of the biasing spring 131. However, when the solenoid unit 128 is energized, the fixing lever 125 is pivoted counterclockwise, as shown by the arrow 135 in FIG. 8, about the boss 126 against the biasing force of the biasing spring 131.

The solenoid unit 128 can be energized when the carriage 120 supporting the illuminating device 17 thereon is driven in the direction R22 along the guide rails 141 with the rods 143 consequently brought to a position adjacent the positioning member 123, for example, a position shown by 136 in FIG. 8. Upon the energization of the solenoid unit 128, the fixing lever 125 is pivoted in the counterclockwise direction 135 about the boss 126 to assume a position shown by the phantom line 138 in FIG. 8. In this condition, the carriage 120 is held still in position with the rods 143 trapped between the associated positioning members 123 and the corresponding fixing levers 125, which condition can be maintained so long as the solenoid unit 128 is energized.

According to the structure shown in and described with reference to FIGS. 7 and 8, the illuminating device 17 can be assuredly stopped at the position aligned with the second illuminating station 14 with no need to use any detector S6.

It is to be noted that a similar structure can be used to hold the illuminating device 17 at the position in alignment with the first illuminating station 11. In such a case, a decision is to be made in reference to the various operating modes of the copying machine 2, to determine whether the position of the illuminating device 17 is upstream of or downstream of the position 52 with respect to the direction shown by the arrow. This is so that the movement of the illuminating device 17, hence, the carriage 120, in the direction of the arrow 55, 121 can be selectively blocked to allow the carriage 120, then blocked, to be trapped by a structure similar to and in a manner similar to that shown in FIGS. 7 and 8. Where the, similar structure is used to hold the illuminating device 17 at the position in alignment with the first illuminating station 11, the use of the detector S5 can be advantageously dispensed of. Thus, according to the second preferred embodiment of the present invention, the number of the detectors used in the copying machine can be advantageously reduced as compared with that in the foregoing embodiment.

Although the present invention has been fully described in connection with the preferred embodiments thereof with reference to the accompanying drawings, it is to be noted that various changes and modifications are apparent to those skilled in the art. By way of example, although in describing the present invention reference has been made to the electrophotographic copying apparatus, the concept of the present invention can be equally applicable to any type of copying machine wherein the optical system is driven to scan the document placed stationary on the document support, or wherein the optical system is held still while the document support supporting thereon the document to be copied is driven relative to the optical system. Also, the concept of the present invention can be equally applicable to any other optical document reader such as, for example, an image scanner.

Accordingly, such changes and modifications are to be understood as included within the scope of the present invention as defined by the appended claims unless they depart therefrom.

What is claimed is:

1. An optical scanning system containing two scanning modes, a first mode of driving a reading means, from a predetermined start position, relative to a document to thereby scan the document, and a second mode of driving said document relative to said reading means, remaining at said predetermined start position, to thereby scan the document, the system comprising:
   input means for inputting an instruction for said system to operate in either said first mode or said second mode;
   scan drive means, connected to said input means, for driving said reading means from said predetermined start position to a second predetermined position when said input means inputs said first mode instruction;
   said reading means, connected to said scan drive means, scanning said document while being driven by said scan drive means, and outputting a scanned representation to a copy means;
   said copy means, responsive to said reading means, copying said document;
   said scan drive means, responsive to said reading means scanning said document, driving said reading means back to said predetermined start position;
   detecting means, connected to said scan drive means, for detecting said reading means to be at said predetermined start position;
   document driving means, connected to said input means, for driving said document past said reading means at said predetermined start position, when said input means inputs said second mode instruction, thereby allowing the scanning operation to initiate from the same predetermined start position in either the first or the second mode;
   said reading means scanning said document as it is driven past said predetermined start position, and outputting a scanned representation to said copy means to be copied.

2. A system, as claimed in claim 1, wherein:
   said scan drive means, responsive to said detecting means not detecting said reading means to be at said predetermined start position, moving said reading means to said predetermined start position.

3. A system, as claimed in claim 1, wherein said optical scanning system ia a copying machine.

4. A method for scanning a document in either one of two scanning modes including a first mode of driving a reading means, from a predetermined start position, relative to a document to scan the document, and a second mode of driving said document relative to said reading means, remaining at said predetermined start position, to thereby scan the document, the method comprising the steps of:
   (a) inputting an instruction through an input means for said system to operate in either said first mode or said second mode;
   (b) driving said reading means, by a scan drive means, from said predetermined start position to a second predetermined position when said input means inputs said first mode instruction;
   (c) scanning said document, by said read means while being driven by said scan drive means, and outputting a scanned representation to a copy means;
   (d) copying said document by said copy means;
   (e) driving said reading means, by said scan drive means, back to said predetermined start position upon completion of said document being scanned;
   (f) detecting said reading means to be at said predetermined start position by using a detecting means;
   (g) driving said document past said reading means at said predetermined start position, by using a document driving means, when said input means inputs said second mode instruction, thereby allowing the scanning operation to initiate from the same predetermined start position in either the first or the second mode;
   (h) scanning said document, as it is driven past said reading means at said predetermined start position and outputting a scanned representation to said copy means to be copied.

5. A method, as claimed in claim 4, further comprising the step of:

(i) moving said reading means to said predetermined start position, by said scan drive means, if said detecting means has not detected said reading means to be at said predetermined start position.

* * * * *